(Model.)
2 Sheets—Sheet 1.
J. J. W. PLACE.
DISH WASHER AND DRIER.
No. 313,764.   Patented Mar. 10, 1885.
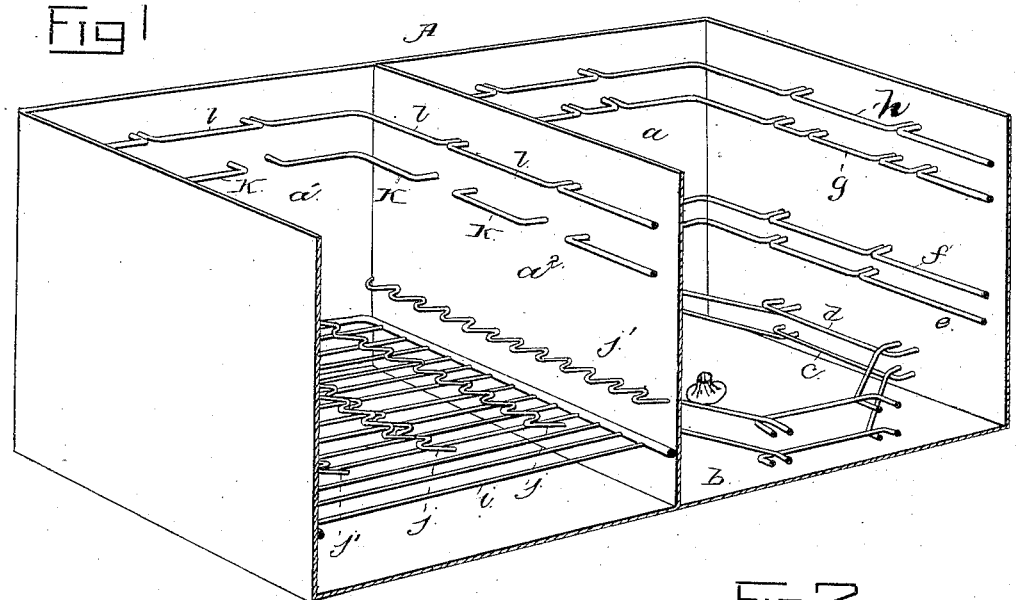
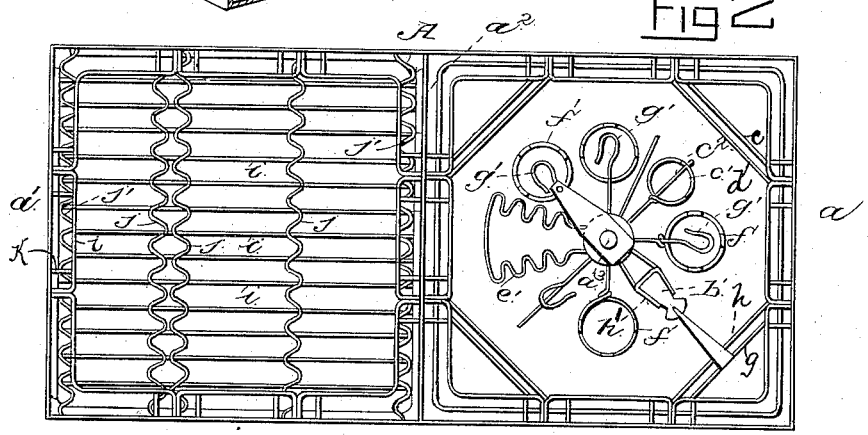
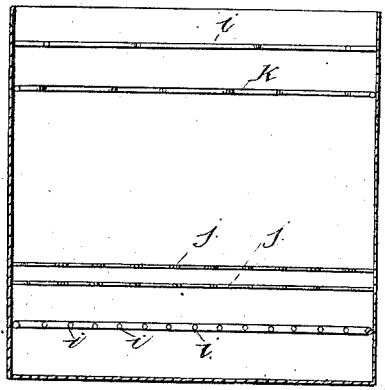
WITNESSES
Norris A. Clark
P. B. Turpin
INVENTOR
John J. W. Place
By R. S. & A. B. Lacey
ATTYS (Model.)
2 Sheets—Sheet 2.
J. J. W. PLACE.
DISH WASHER AND DRIER.
No. 313,764. Patented Mar. 10, 1885.
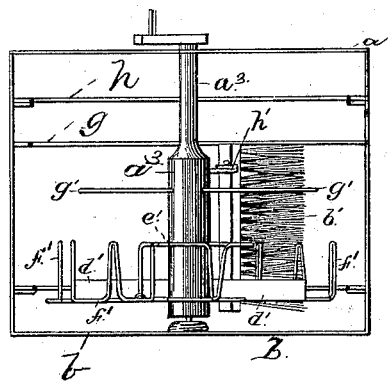
Fig. 4.
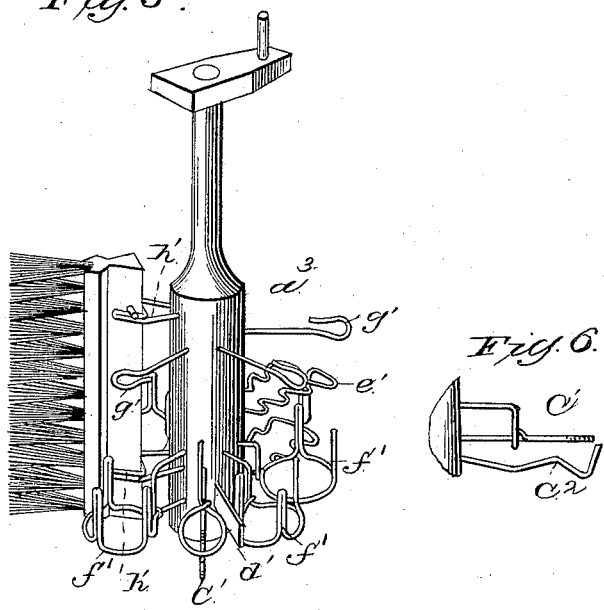
Fig. 5.
Fig. 6.
WITNESSES:
W. A. Clark.
P. B. Turpin
Fig. 7.
INVENTOR
John J. W. Place
By R. S. & A. P. Lacey
Attys

UNITED STATES PATENT OFFICE.

JOHN JOSEPH WILDY PLACE, OF RANTOUL, ILLINOIS.

DISH WASHER AND DRIER.

SPECIFICATION forming part of Letters Patent No. 313,764, dated March 10, 1885.

Application filed April 20, 1883. (Model.)

*To all whom it may concern:*

Be it known that I, JOHN J. W. PLACE, a citizen of the United States, residing at Rantoul, in the county of Champaign and State of Illinois, have invented a new and useful Dish-Washing Machine, of which the following is a specification.

My invention relates to improvements in dish washers and driers; and it consists in the construction, combination, and arrangement hereinafter described and claimed.

In the drawings, Figure 1 is a perspective view of the washing and drying chambers side by side, one wall being broken away to show the interior. Fig. 2 is a plan view of same, the revolving carrier being in place in the washing-chamber. Fig. 3 is a vertical transverse section of the drying-chamber. Fig. 4 is a vertical transverse section of the washing-chamber with the carrier in place. Fig. 5 is an enlarged detail perspective view of the dish-carrier. Fig. 6 is a detail view showing the dessert-dish holder; and Fig. 7 is a detail view of a heating-block, as will be presently described.

The washing-chamber $a$ and the drying-chamber $a'$ are arranged one alongside the other, and formed, preferably, out of a single tank, A, by means of a central partition, $a^2$.

The sides of the chamber $a$ are provided with rods $c\ d$. The lower rod, $c$, is extended around the chamber near its bottom, and crosses the corners, as shown in Figs. 1 and 2. The rod $d$ is arranged above the rod $c$, and a slight distance farther out from the walls of the chamber than the said rod $c$, as clearly shown. These rods are arranged parallel to each other their full length, and are joined to the chamber at intervals, as shown. The object of these rods is to hold plates and other flat dishes, the same being placed down between said rods, with their upper edges bearing against the sides of the chamber, whereby they will be securely held, as will be understood from the drawings.

Rods $e\ f\ g\ h$ are secured to the inner side of the casing above rods $d$, and are also adapted to support plates and other flat dishes, as will be understood.

The drying-chamber $a'$ is provided near its bottom with a series of horizontal rods, $i$, which form a grating, through which the water may drip from the drying articles. Wire rods $j$ are extended across this chamber above the wires $i$, and a suitable distance apart to permit dishes to be placed between them. These wires $j$ are waved, as shown, to form seats for the edges of the dishes, and also to give the rods sufficient tension to properly hold the dishes. Similar waved rods, $j'$, are secured to the side of the drying-chamber, and are adapted to hold dishes placed behind them and clamp the said dishes against the side of the casing. This drying-chamber is also provided near its upper end with dish-holding rods $k\ l$, arranged and adapted to support the dishes in similar manner to the rods $h\ g$ in the washing-chamber.

When the dishes have been washed, they are placed in the drying-chamber, and a metal block, as shown in Fig. 7, which may be of any suitable shape or size desired, is heated and inserted in said chamber, which is closed by a suitable lid, and the dishes will soon be properly dried, as will be understood.

The revolving carrier is shown in detail in Fig. 5. It is composed of the shaft $a^3$ and the several other parts hereinafter described. The shaft $a^3$ has its lower end journaled in the bottom $b$ of the washing-chamber, and its upper end is provided with a crank, as shown, or other suitable devices whereby it may be revolved. This shaft is provided with plates $d'$, projected radially, and arranged to splash the water in the chamber onto the dishes held in the racks formed by rods $c\ d\ g\ h$. This shaft also is provided with dish-racks $e'$, cup-holders $f'$, goblet-holders $g'$, and brush-clamps $h'\ h'$, all of which are preferably extended radially from the shaft. This shaft is also provided with a holder composed of ring $c'$ and wire retaining-clamp $c^2$, fitted to hold the ordinary deep-bottomed dessert-dish, which is placed in an inverted position under ring $c'$ and held by clamp $c^2$, as will be understood from Fig. 6.

The racks $e'$ are constructed with upper and lower sections of waved wires, and are adapted to hold fruit and other small dishes. The holders $f'$ are adapted to receive tea-cups or small bowls, and the holders $g'$ are bent to form, practically, hooks suited to clamp and hold the shanks of goblets.

The clamps $h'$ are bent in about the form shown in Fig. 4, and the back of the brush $b'$ is cut in a somewhat dovetail form to fit the said clamps, and when placed therein will be securely held. This brush $b'$ serves to rub and cleanse the plates and other dishes secured in the racks of the washing-chamber, which, in the operation of the machine, is to be provided with a sufficient quantity of water, as will be understood.

It is thought the operation and advantages of my improvement will fully appear from the foregoing description.

By my invention the dishes may be thoroughly cleansed and dried, the operation being simple, and requiring but little time, as will be appreciated.

Having thus described my invention, what I claim, and desire to secure by Letters Patent, is—

1. In a dish-washer having the inner walls of its washing-chamber provided with supports fitted to receive and hold plates and similar dishes, the vertical shaft operating in said chamber, and provided with means for supporting the smaller dishes, and with a brush arranged to brush the plates, &c., as and for the purposes specified.

2. In a dish-washer, the combination of the washing-chamber provided with dish-supporting rods $c\ d\ e\ f\ g\ h$, the shaft $a^3$, journaled therein and provided with cup-supports $f'$, dish-racks $e'$, splashers $d'$, goblet-holders $g'$, and brush-clamps $h'$, and the brush $b'$, removably secured in said clamps $h'$, all arranged and operating as and for the purposes specified.

In testimony whereof I hereby affix my signature in the presence of two witnesses.

JOHN JOSEPH WILDY PLACE.

Witnesses:
 GEORGE CONDIT,
 LOUIS A. SMYRES.